Patented Apr. 6, 1948

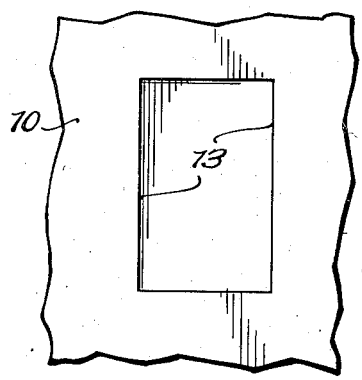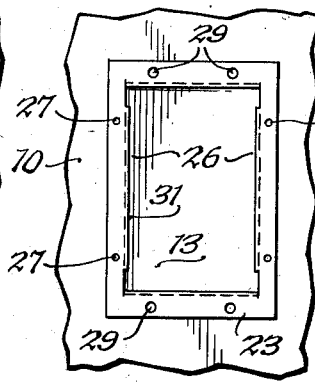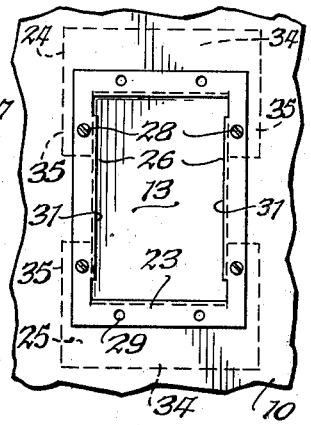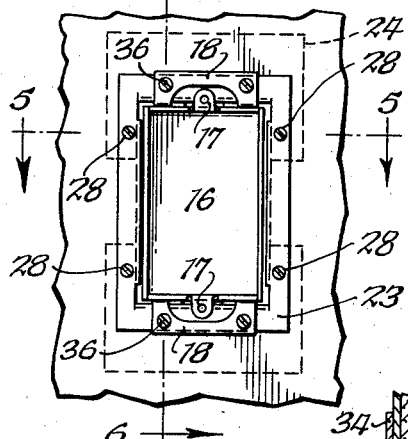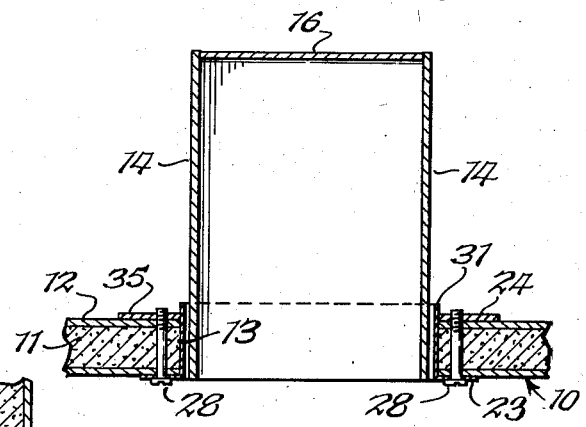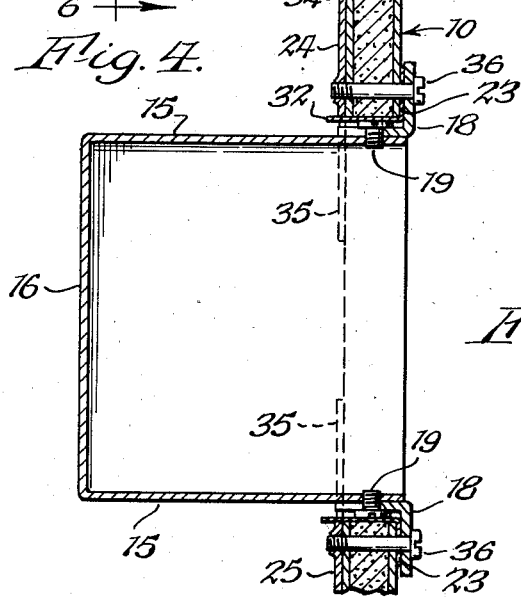

2,439,090

UNITED STATES PATENT OFFICE 2,439,090

ELECTRICAL OUTLET BOX

Harry C. Keating, Buffalo, N. Y.

Application April 10, 1945, Serial No. 587,452

2 Claims. (Cl. 220—3.6)

This invention relates to an improved electrical outlet box, and it has particular reference to a device of this character which may be readily and securely positioned in a building wall.

In the customary type of outlet box heretofore employed to house electrical connections, switch parts, or plugs, there has simply been provided a sheet metal box having an open face and a pair of lugs positioned in the plane of the face, so that when the box is let into the wall it can be connected thereto by screws or nails. Such boxes present a continuing problem to the workmen who install them. They are frequently pre-located in the building plans, between the studding and just above the base board or at some other suitable elevation, and it often happens that the material of the wall at the desired point is too weak to hold the screws in place. This is particularly true when the nail holes line up with plaster, or even with free ends of the lath, and the difficulties are augmented when the installation is made through light plywood or plasterboard.

According to the present invention, means are provided to secure the box in the wall, irrespective of its own inherent weakness, thus permitting the outlet to be positioned as the specifications require, and also providing a firm and secure connection which will not pull loose under service conditions. A practical form of the invention is illustrated in the accompanying drawing, wherein:

Fig. 1 is a front elevation of a recess cut into the wall to receive the box;

Figs. 2 and 3 are similar views showing successively the locating of front and back templates;

Fig. 4 is a front elevation of the box installed in the recess; and

Figs. 5 and 6 are enlarged sections taken respectively on the lines 5—5 and 6—6 of Fig. 4.

In the drawings, the numeral 10 designates a building wall which for illustrative purposes may be taken as being made of plasterboard, formed by a layer of gypsum or similar material 11 which is faced with layers of paper 12. In order to mount an outlet box on the wall with a flush outer surface, it is customary to cut a rectangular recess 13 in the wall, of slightly larger dimensions than those of the box itself. The box itself consists of five walls, which, as shown in Figs. 5 and 6, include side walls 14, top and bottom walls 15, and a back wall 16. The front is left open in order to insert the electrical connectors, and finally is closed with a face plate, not shown, which is connected by suitable screws to the tapped lugs 17 shown in Fig. 4. As the electrical features form no part of the present invention, and are well known, it is deemed unnecessary to illustrate or describe them.

The box may moreover be provided with angular lugs 18, mounted on the walls 15 by means of screws 19, and formed with spaced apertures on the outer exposed surfaces to receive a screw, nail, or other type of fastener. However, in view of the nature of the wall, as previously explained, any such fastener is apt to pull loose as the switch is snapped or as floor plugs are pushed in or removed. This defect is now overcome by providing inner and outer templates 23, 24, and 25, which are respectively located on opposite sides of the wall 10 and around the recess 13.

The template 23 comprises a rectangular sheet metal plate having a central opening 26 sufficiently large to receive the walls of the outlet box with working clearance. The side walls of the template are formed with spaced apertures 27 to receive screws 28, by means of which the parts are held in place, while the end walls are formed with spaced apertures 29 adapted to be aligned with the apertures on the box lugs 18. When the center opening 26 is punched in the template 23, some of the metal is bent inwardly to form angularly disposed surfaces 31, 32, which frame the recess 13 and thus protect the exposed edges of the wall material. The template is then positioned as shown in Fig. 2. It will also be apparent that the template may be laid against the wall before the recess 13 is cut, to mark out the area to be removed. As clearly shown in Figs. 2, 3, and 4, the surfaces 31 of the front template do not extend completely to the corners of the openings 26, but terminate a short distance therefrom. Gaps or clearance areas are accordingly provided which may receive projections, such as screws or lugs, which are frequently found in outlet boxes, thereby reducing the requisite clearance between the sides of the box and the flanges 31.

The back templates 24 and 25 may be similar in construction, and each consists of a flat metal plate having an upper web 34 and depending legs 35. Each portion of the back template is formed with tapped openings adapted to be aligned with the apertures 27 and 29 in the front template 23, so that, when the parts are positioned as shown in Fig. 3, the templates may be bolted together through the wall 10 by means of the screws 28. In making this assembly, the front template may be inserted in the opening 13, and the holes through the wall are then drilled. The back templates are of such a size as to be readily insertable through the recess, and they may be positioned and held with the fingers while the screws 28 are inserted and taken up. The recess is thus framed on both sides with resistant metal, which obviously cannot be pulled away with any ordinary force.

The outlet box is then fixed to receive such wires as are indicated for the particular electrical fixtures to be used, and the box is then slipped into the recess 13 and within the template 23, as shown in Fig. 4. As the apertures in the lugs 18 are aligned with the apertures 29, it is then a simple matter to secure the box, as by means of the screws 36. As the box is then hung from the templates, which in turn engage a substantial area of the wall, it will be apparent that the installation is free from the defects heretofore encountered, and that it may be made with facility in such location as is desired.

While the invention has been described with respect to one embodiment representing a successful and practical form, it will be apparent to those skilled in the art that various modifications and changes may be made without departing from its spirit. Accordingly, it is intended that the invention should be deemed commensurate with the scope of the following claims.

I claim:

1. In an outlet box assembly including an outlet box having a substantially rectangular outline and an open front and adapted to receive a cover plate overlying said open front, said box being adapted to be let into a recess formed in a wall with said open front disposed substantially flush with said wall, a front template formed with an opening and a marginal portion adapted to abut the outer face of the wall within the confines of said cover plate, said template being formed around said opening with inwardly extended flanges, the flanges on at least two sides of said opening terminating short of the corners of the opening, whereby said opening may be brought into close proximity to the walls of the box despite projections therefrom adjacent said corners, a pair of back templates adapted to be inserted through said recess and positioned in parallelism with the front template, said back templates being adapted to abut the inner surface of said wall and to lie in close proximity to the margin of said recess and the walls of said box, said back templates so engaging at least two sides of said recess, screws extending between the front template and both of said back templates, and additional screws for securing said box to the front template.

2. In an outlet box assembly including an outlet box adapted to be let into a recess formed in a wall, a front template comprising a flat sheet adapted to abut the front side of the wall around the recess, an opening in the sheet adapted to be substantially coextensive with the area of the recess, flanges projecting inwardly from said sheet along the margin of said opening, said flanges being adapted when inserted in the recess to lie in close proximity thereto, said flanges being interrupted around said opening thereby to define an opening having a greater width at predetermined portions than other portions, a pair of back templates each of which comprises a flat sheet adapted to be inserted through said recess, each of said sheets comprising a web and flange adapted to be positioned against the inner surface of the wall and with its edges in close proximity to the edges of the recess, screws passing through the front template and engaging the back templates, and means on the front template for supporting the outlet box therefrom, the sides of said box being adapted to project through the recess and to lie in close proximity to said flanges.

HARRY C. KEATING.

REFERENCES CITED

The following references are of record in the file of this patent:

UNITED STATES PATENTS

| Number | Name | Date |
|---|---|---|
| 1,487,117 | Merrill | Mar. 18, 1924 |
| 1,490,252 | Bissell | Apr. 15, 1924 |
| 1,540,893 | Merrill | June 9, 1925 |